United States Patent
Hirotsune et al.

(10) Patent No.: US 6,723,411 B2
(45) Date of Patent: Apr. 20, 2004

(54) INFORMATION RECORDING MEDIUM AND METHOD FOR MANUFACTURING AN INFORMATION RECORDING MEDIUM

(75) Inventors: Akemi Hirotsune, Saitama (JP); Makoto Miyamoto, Ome (JP); Toshimichi Shintani, Kodaira (JP); Keikichi Andoo, Musashino (JP); Yumiko Anzai, Ome (JP); Takahiro Kurokawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 10/082,106

(22) Filed: Feb. 26, 2002

(65) Prior Publication Data
US 2003/0124387 A1 Jul. 3, 2003

(30) Foreign Application Priority Data
Dec. 12, 2001 (JP) ......................... 2001-378026

(51) Int. Cl.$^7$ ................................. B32B 3/02
(52) U.S. Cl. ................. 428/64.1; 428/64.5; 428/64.6; 430/270.13
(58) Field of Search ............... 428/64.1, 64.4, 428/64.5, 64.6, 913; 430/270.13, 495.1, 945; 369/283, 288

(56) References Cited

U.S. PATENT DOCUMENTS

| | | | | |
|---|---|---|---|---|
| 6,231,945 B1 | * | 5/2001 | Miyamoto | 428/64.1 |
| 2001/0041304 A1 | * | 11/2001 | Uno | 430/270.13 |
| 2002/0076646 A1 | * | 6/2002 | Zhou | 430/270.13 |
| 2002/0168587 A1 | * | 11/2002 | Sakaue | 430/270.13 |

FOREIGN PATENT DOCUMENTS

| | | |
|---|---|---|
| JP | 5-144083 | 6/1993 |
| JP | 6-124481 | 5/1994 |
| JP | 8-287516 | 11/1996 |
| JP | 10-21582 | 1/1998 |

OTHER PUBLICATIONS

Japan Society of Applied Physics Lectures, vol. 3, pp 29–Z–12 (Spring, 1998), 1127.

M. Otoba et al, "Phase–Change Optical Disk Having Nitride Layers on Both Sides of Recording Layer", Japan Society of Applied Physics Lectures, vol. 3, p. 1128, 29p–ZK–13, 1998.

N. Yamada et al, "Phase–Change Optical Disk Having a Nitride Interface Layer", Japan Journal of Applied Physics, vol. 37, 1998, pp. 2104–2110.

* cited by examiner

Primary Examiner—Elizabeth Mulvaney
(74) Attorney, Agent, or Firm—Mattingly, Stanger & Malur, P.C.

(57) ABSTRACT

To provide an information recording medium which permits high density recording/reproduction, which has good thermal stability, and which, due to the use of an interface layer with a high sputter rate, has good recording/reproduction characteristics and is excellent for mass production. An information recording medium wherein the thickness of an interface layer 3 is 0.25 or more but 0.67 or less of the total thickness of a first protective layer 2 and the interface layer 3, and the interface layer 3 contains at least tantalum (Ta) and oxygen (O). The medium is excellent for mass production and has good recording/reproduction characteristics for high density recording/reproduction.

12 Claims, 10 Drawing Sheets

- 1' (SUBSTRATE)
- 2' (PROTECTIVE LAYER 1)
- 3' (Cr-O INTERFACE LAYER)
- 4' (RECORDING FILM)
- 5' (PROTECTIVE LAYER 2)
- 6' (ABSORPTION CONTROL LAYER)
- 7' (REFLECTIVE LAYER)
- 8 (ADHESIVE LAYER)
- 7 (REFLECTIVE LAYER)
- 6 (ABSORPTION CONTROL LAYER)
- 5 (PROTECTIVE LAYER 2)
- 4 (RECORDING FILM)
- 3 (Cr-O INTERFACE LAYER)
- 2 (PROTECTIVE LAYER 1)
- 1 (SUBSTRATE)

INFORMATION RECORDING MEDIUM AND METHOD FOR MANUFACTURING AN INFORMATION RECORDING MEDIUM

BACKGROUND OF THE INVENTION

1. Field of the Invention

This invention relates to a method of manufacturing an information recording medium, and in particular to a method of manufacturing an information recording medium using an optical disk.

2. Description of the Prior Art

The principle of recording information on a thin film (recording film) by irradiating with laser light is well-known. Techniques are also known which use an atomic arrangement change due to irradiation with laser light, such as a phase change or phase transformation of a film material. As this phase-change is accompanied by very little deformation of the thin film, it has the advantage that two disks can be directly glued together to make an information recording medium having a double-sided disk structure.

Usually, these information recording media comprise for example a protective layer, a recording layer such as GeSbTe, a protective layer and a reflective layer on a substrate.

However, in rewritable phase-change optical disks, such as DVD-RAM, because the protective layer penetrates into the recording film, crystallization is poor and the optimal crystallization rate is not realized, or, crystallization occurs too early and the amorphous state transformation is inadequate, so the reflectivity level after overwrite fluctuates. Hence, an interface layer having a good thermal stability was provided between the protective layer and the recording film to prevent the penetration of the protective layer into the recording film. For example, an interface layer of oxide or nitride was provided which contacts the recording film (Prevention of protective layer counter-diffusion between recording films in phase-change optical disks by oxide interface layer: Yasushi Miyauchi, Motoyasu Terao, Akemi Hirotsune, Makoto Miyamoto, Nobuhiro Tokuyado: Japan Society of Applied Physics Lectures, Vol. 3, p. 29-ZK-12 (Spring, 1998), 1127). Compared to the case of a double-sided $(ZnS)_{80}$—$(SiO_2)_{20}$ protective layer, the crystal nucleus growth rate and crystal growth rate are higher, and the crystallization rate is rapid. Moreover, by using a nitride on both interface layers, diffusion of the recording film material is suppressed and the crystallization rate is optimized. (Phase-change optical disks with nitrides on both sides of the recording film, Mayumi Otoba, Noboru Yamada, Hiroyuki Ota, Katsumi Kawahara, Japan Society of Applied Physics Lectures, p. 29-ZK-13 (Spring, 1998) 1128) and N. Yamada, M. Otoba, K. Kawahara, N. Miyagawa, H. Ota, N. Akahira and T. Matsunaga: Phase-change optical disk having a nitride interface layer: Jpn. J. Appl. Phys. Part 1, 37 (1998) 2104. To achieve many overwrites, diffusion into the recording film, such as diffusion of Zn, S from the upper and lower ZnS—$SiO_2$ protective layers into the recording film, must be prevented. For this purpose, it is effective to provide the interface layer.

In JP Hei 5-144083, the interface layer is provided on the upper and lower sides of a recording film, using TaO, CrO and MnO, for example, as the interface layer. Further, in JP Hei 6-124481, JP Hei 10-21582 and JP Hei 8-287516, TaO and other compounds (e.g., ZnS, TaS) are provided as a layer in contact with the recording film.

In JP Hei 5-144083, for example, the thickness of the interface layer is 3 nm, 150 nm, the thickness of the first protective layer is 150 nm, and (thickness of interface layer)/(thickness of interface layer+thickness of first protective layer) is 3/(150+3)=0.02.

In this specification, the term "phase-change" is used to describe not only a phase change between crystal and amorphous states, but also in the sense of a phase change such as fusion (change to liquid phase) and recrystallization, and a phase change between crystalline states. Mark edge recording means a recording method wherein the edge of a recording signal is made to correspond to "1", and parts between marks and the inside of a mark are made to correspond to "0". In this specification, optical disk means a disk on which information is recorded by irradiation of light, and/or a disk wherein information can be reproduced by irradiation of light.

SUMMARY OF THE INVENTION

However, in an interface layer material having good heat stability, the sputter rate is very small, and this slowed down overall production. Also, information recording media using interface layer materials of good heat stability suffered from the drawback that they were not suitable for mass production.

It is therefore an object of this invention to provide an information recording medium having good thermal stability which, due to the use of an interface layer with a high sputter rate, also has good recording/reproduction characteristics and is excellent for mass production, and to provide a method of manufacturing same.

To resolve the above problems, this invention provides an information recording medium having the following characteristics. Specifically, a Tao—O interface layer with good thermal stability and high sputter rate is used. In this way, it is possible to provide an information recording medium which has good recording/reproduction characteristics, and is excellent for mass production. In the past, materials used for the interface layer either had a low sputter rate or their thermal stability was poor, and they could not satisfy both requirements. This invention reconciles these objectives.

The interface layer is provided between a first protective layer and a recording film, which is in contact with a recording layer. The thickness of the interface layer is 0.20 or more but 0.67 or less of the total of the first protective layer and interface layer, and the composition of the interface layer contains tantalum (Ta) and oxygen (O).

Hence, rewritability is good, and the productivity is improved because the sputter rate of the interface layer is high. Herein, rewritability was determined by examining the recording waveform deterioration due to overwrites described later, or more specifically the reflectivity of the crystal level (Ic).

By arranging the thickness of the interface layer to be from 0.20 or more but 0.67 or less of the total thickness of the first protective layer and interface layer as described above, productivity is improved by approximately 170% compared to the prior art and this already gives a satisfactory improvement, but if the thickness of the interface layer is arranged to be from 0.30 or more but 0.60 or less of the total thickness of the first protective layer and interface layer, productivity is further improved and attains approximately 195% or more compared to the prior art which is very desirable.

Regarding the recording waveform deterioration due to overwrite, we examined the reflectivity variation of the crystal level (Ic).

Hereafter, the method of evaluating the reflectivity variation is described. We shall give details only for evaluating the reflectivity variation for groups, but an identical method may be used for lands.

First, the disk to be measured is set in a tester, and rotated. An optical head is then brought into the vicinity of the track to be measured. Autofocus is applied at this position, and the tracking error signal (difference signal) is monitored on an oscilloscope. The autofocus gain is controlled so that the tracking error signal amplitude in the group is maximized (AF offset control). Next, tracking is applied to the group while the autofocus is still applied. Recording is then performed by varying the laser power with a random signal. The recording power is found at which the difference (asymmetry) between the centerline of the envelope of the signal corresponding to the 3T (shortest) mark and space, and the centerline of the envelope of the signal corresponding to the longest mark and space, is +5%, and this is taken as the optimum recording power. Next, the relation between the radial (radial direction)-tilt and the jitter value after 10 overwrites (optimum power) is measured by a time interval analyzer (TIA), and the radial-tilt at which jitter is minimized, is calculated. In other words, jitter is measured while the radial-tilt is varied, the radial-tilt is found at which jitter is minimized, and this is taken as the optimum radial-tilt. Next, tracking offset control is performed. First, 10 overwrites are performed at the optimum power on the lands on both sides of the group. Then, the crosstalk from the lands in the group is measured by a spectral analyzer. The tracking gained is adjusted so that this crosstalk is minimized. Preferably, the optimum radial-tilt is found again, and tracking offset control is repeated. Finally, after the AF offset control, tracking offset control and radial-tilt control are completed for the group, and the beam is moved to the track for measuring reflectivity variation. The reproduce signal (sum signal) of the ID part (part representing the address information in the pit) situated one half a track away to the left and right of this track, is monitored, and after one long mark is recorded, the reflectivity, i.e., the voltages of the crystal level (Ic) and the amorphous level (Ia) are measured. Further, the reflectivity after 10 to 10000 overwrites is measured.

In the same way, the reflectivity in a land is measured. Herein, regarding the relation between crystal level and reflectivity, when Ic is 85 mV, the reflectivity of the medium is 15%, so it is preferred that Ic is 85 mV. If the reflectivity of the medium is less than 15%, the degree of modulation of the record/reproduce signal is low, AF or tracking become unstable, and neither recording nor reproduce can be performed, therefore it is preferred that the reflectivity is 15% or higher. Due to these reasons, even in the DVD-RAM specification, the reflectivity is determined to be 15% or higher.

Next, another aspect of this invention will be described. In the other aspect of this invention, the following composition is proposed. Specifically, the interface layer is provided between the first protective layer and recording film, this interface layer is in contact with the recording film, the interface layer contains tantalum (Ta), oxygen (O) and a metal element (any of M=Sb, Bi, Al, Ga, In, Si, Ge, Sn, Pb, Zn, Cu, Ag, Ni, Pd, Pt, Co, Rh, Ir, Fe, Ru, Os, Mn, Re, Cr, Mo, W, V, Nb, Ti, Zr, Hf, Sc, Y and La), and the Ta amount in the interface layer (atomic %) is in the range of 3 atomic % to 28 atomic %. As the reflectivity does not change even if 10000 overwrites or more are performed, the medium is stable to multiple overwrites.

The interface layer may also contain sulfur in addition to tantalum, oxygen and the above-mentioned metallic elements. That is, the interface layer contains tantalum (Ta), oxygen (O), sulfur (S) and a metallic element (any of M=Bi, Ga, In, Sn, Pb, Zn, Ag, Ni, Co, Fe, Mn, Mo, W, Nb, Zr and Hf), and the Ta amount in the interface layer (atomic %) is in the range of 3 atomic % to 28 atomic %. Thus, as the reflectivity does not change even if multiple overwrites are performed, multiple overwrites can be performed with high stability.

Another aspect of this invention will now be described. In this aspect, the interface layer is provided between the first protective layer and recording film, the interface layer is in contact with the recording film, the interface layer contains tantalum (Ta) and oxygen (O), and the absolute value of the extinction coefficient k of the interface layer is 0.22 or less. In this way, it is possible to satisfy the reflectivity standard of 15% or more for DVD-RAM.

This invention is particularly effective for recording densities (track pitch, bit pitch) higher than 4.7 GB, which is the specification for DVD-RAM. When the wavelength of the light source is not in the vicinity of 660 nm or the aperture (NA) of the collimating lens is not 0.6, the invention has an effect at recording densities converted from these by wavelength ratio or NA ratio for both the radial direction and circumferential direction.

The basic technology of recording devices (optical disk drives) using the phase-change recording medium of this invention is as follows.

1 Beam Overwrite

A phase-change recording medium is normally rewritten by overwrites (rewriting information by overwriting without first erasing). This principle is shown in FIG. 7. If the recording medium is melted at a high laser power, it is rapidly cooled after irradiation, and the recording mark will be in the amorphous state whether the previous state is crystalline or amorphous. If it is heated to a temperature with a high crystallization rate below the melting point at an intermediate laser power, parts which were previously in an amorphous state become crystalline. Parts which were originally crystalline remain crystalline. With DVD-RAM, moving images are often recorded, and it may be expected that long periods of information will be recorded on one occasion. In this case, if recording is performed after first erasing all previous data, twice as long is required and a very large buffer memory may be necessary. Therefore, it is absolutely necessary that overwrites can be performed.

Mark Edge Recording

With DVD-RAM and DVD-RW, mark edge recording which permits a high density recording is used. In mark edge recording, the two edges of a recording mark formed on the recording film are made to correspond to the 1 of digital data. Consequently, a high recording density can also be achieved by making the shortest recording mark correspond not to one, but to two or three reference clocks. In DVD-RAM, 8–16 modulation is adopted in which the mark is made to correspond to three reference clocks. As shown by the comparison of FIG. 8, as compared to mark position recording in which the center position of a circular recording mark is made to correspond to the 1 of digital data, high density recording can be performed without making the recording mark very small. However, a recording medium is required wherein the shape distortion of the recording mark is very small.

Format

As shown by the position of the header zone at the beginning of each sector in FIG. 9, DVD-RAM are formatted by dividing one circumference into 24 sectors so random access recording can be performed. Therefore, a wide range of devices such as DVD video cameras and DVD video recorders can be used from the internal storage device of a personal computer.

Land Groove Recording

In DVD-RAM, crosstalk is reduced by land-groove recording wherein recording is performed both in the tracking groove and in the projections between grooves. In land-groove recording, the phenomenon is used that when the groove depth is in the vicinity of $\lambda/6n$ ($\lambda$ is the laser wavelength and n is the refractive index of the substrate) relative to the recording mark for contrast (light/dark), the recording mark of the adjacent track becomes difficult to see in both lands and grooves, hence in the example of a 4.7 GB DVD-RAM, the track pitch is as narrow as 0.615 $\mu$m. Due to the phase difference between recording marks and other parts, i.e. the phase difference component of the reproduce signal, crosstalk tends to be generated, so a design is required which sufficiently suppresses this. The phase difference component of the reproduce signal is added as a reverse phase to the light/dark reproduce signal of the lands and grooves, and also causes an imbalance in the reproduce signal level of the lands and grooves.

ZCLV Recording Method

In a phase-change recording medium, if the recording wavelength is not changed, it is desirable to record at an optimum linear velocity corresponding to a crystal growth rate which allows good recording/reproduction characteristics to be obtained. However, when areas between recording tracks with different radii on the disk are accessed, it takes time to change the rotation speed in order to make the linear velocity the same. Hence, in DVD-RAM, as shown in FIG. 11, the ZCLV (Zoned Constant Linear Velocity) method is used wherein the radial direction of the disk is divided into 24 zones so that the access speed does not decrease. The rotation speed in one zone is constant, and the rotation speed is changed only when it is required to access another zone. In this method, the linear velocity is slightly different between the innermost track and outermost track of the zone, so the recording density is also slightly different, but recording can be performed at effectively the maximum density over the whole disk. The technique used with recording medium of this invention is described below.

Absorption Control

With a high linear velocity (8.2 m/s) medium such as a 4.7 GB/side medium, pre-erase (where the recording mark is first erased in a belt-shaped area in the temperature range 300° C. to 550° C. before the area in which the recording film is melted by the light spot irradiation), which can be expected in a lower linear velocity recording medium such as a 2.6 GB/side DVD-RAM (6 m/s), cannot be expected to occur sufficiently. Therefore, the absorption ratio Ac/Aa inside and outside the recording mark must be maintained at 0.8 or more. By performing absorption control, the mark edge position can be precisely recorded. In absorption control, a method exists wherein the reflective layer is made thinner so that, in a recording mark which has a low reflectivity, the light is transmitted and optical absorption in the recording film does not become excessive (Noboru Yamada, Nobuo Akahira, Kenichi Nishiuchi, Keisho Furukawa: A high-speed overwrite phase change optical disk, Japan Society of Electronic and Information Engineers, Technical Research Report MR92-71, CPM92-148 (1992), 37). The reflective layer uses Cr or Al, or an alloy containing one of these, for the purpose of absorption ratio control and maintaining high contrast. This layer absorbs light and transmits light to a suitable degrees hence light which has been transmitted through the recording film in the recording mark which has a low reflectivity, is reflected by the reflective layer and reabsorbed by the recording film. Thus, the temperature does not rise too much, and Ac/Aa is controlled to be 1 or more.

In high density phase change optical disks, as the track pitch is narrow, it is necessary to consider the phenomenon known as cross-erase wherein part of the recording mark which is already written on the adjacent track is erased. To prevent this cross-erase, transverse diffusion of heat is important. One reason for this is that heat is not easily transmitted to the adjacent tracks in transverse diffusion. Also, if Ac/Aa is larger than 1, the temperature rise of the recording marks of the adjacent tracks is less, and this also works to prevent cross-erase.

To prevent cross-erase, it is also important to prevent recrystallization. This is because, as shown in FIG. 12, in recrystallization which occurs from the periphery after the melting of the recording film during recording, the part which remains as an amorphous recording mark becomes narrower, so it is necessary to melt a wider area to form a recording mark of a predetermined size and the temperature of adjacent tracks tends to rise. If the heat is diffused in a transverse direction, recrystallization can also be prevented. This is because when the recording mark is formed, the heat in the center part diffuses in a lateral direction so that cooling around the melting area is delayed, thus the tendency to recrystallization is prevented.

First Protective Layer

The first protective layer is a laminated film provided on the light incidence side of the recording film to protect the recording film. As regards the refractive index and film thickness, to maintain high optical contrast, it is preferred that in the vicinity of a reproduce wavelength of 660 nm, the refractive index n is from 1.5 to 2.3, and the film thickness is from 100 to 150 nm. To obtain good recording sensitivity, it is preferred that the heat conductance on this layer is at least approximately one digit higher than that of the recording film. Even outside these limits, the effect of the interface layer of this embodiment was still observed.

Recording Waveform

The following relation exists between the recording waveform and recording mark shape. For example, in a 4.7 GB DVD-RAM, the shortest mark length is 0.42 $\mu$m and the linear velocity is 8.2 m/s. Due to this, a recording pulse which forms one recording mark is divided into plural pulses. To precisely form the recording mark, more emphasis is placed on correct heating than on preventing build-up of heat, and as shown in FIG. 13, the recording waveform has few or no parts with a lower erase power level. Also, as already stated, it is necessary to perform adaptive control of the width of the first pulse and last pulse which form the recording mark (adaptive control: adjustment of position where last pulse which forms the previous mark finishes and first pulse which forms the next mark starts according to length of space involved and length of previous mark).

The high-performance techniques may be summarized as follows:

1. Techniques contributing to narrow track pitch Land-groove recording, absorption control
2. Techniques contributing to narrow bit pitch Mark edge recording, ZCLV recording method, absorption control, interface layer, adaptive control recording waveform
3. Techniques contributing to high speed 1 beam overwrite, recording film composition, absorption control, interface layer
4. Techniques contributing to high numbers of overwrites.

Interface Layer

One layer has plural roles as described above, and the functions of each layer are inter-related in a complex manner. The interface layer contributes to narrow pitch, high speed and high numbers of overwrites. Therefore, it is important to choose the optimum combination and thicknesses of laminated films to achieve high performance.

DESCRIPTION OF THE PREFERRED EMBODIMENTS

Hereafter, some specific embodiments of this invention will be described in detail.

Embodiment 1

Figure 1:
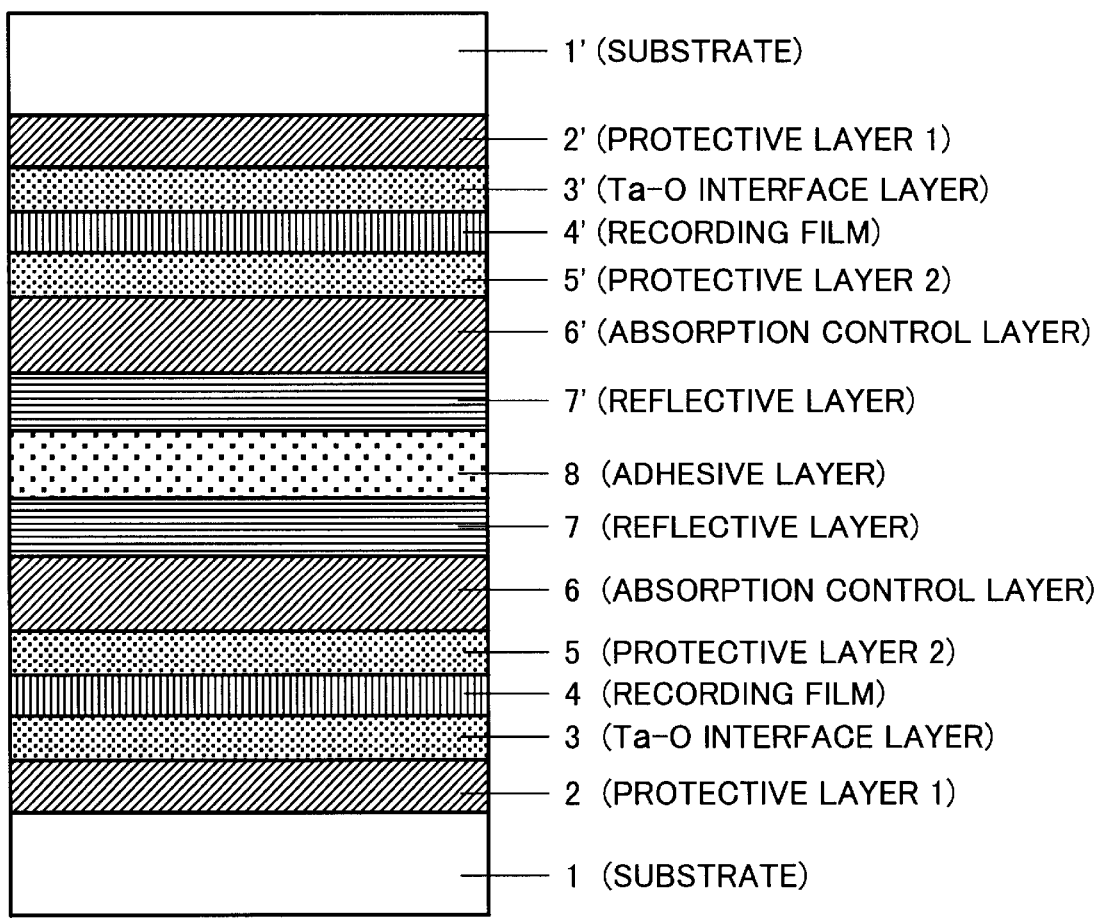
FIG. 1 is a cross-sectional schematic view of an example of the information recording medium according to this invention.

Composition of the Information Recording Medium of This Invention, and Its Manufacturing Method FIG. 1 is a cross-sectional structural diagram of a disk information recording medium according to the first embodiment of this invention. This medium was manufactured as follows.

First, a polycarbonate substrate 1 was prepared having a diameter of 12 cm, thickness of 0.6 mm, a tracking groove for recording land-groove recording with a track pitch of 0.615 microns. It also has a pit sequence representing address information or the like at a position offset from the track center, i.e., on an extension of the boundary between a land and a groove. This substrate was conveyed to a sputtering chamber 1 of FIG. 6, and a first protective layer 2 comprising $(SiO_2)_{20}(ZnS)_{80}$ was formed to a thickness of 104 nm. Next, it was conveyed to a sputtering chamber 2, and an interface layer 3 comprising a $Ta_2O_5$ film was formed to a thickness of 26 nm. Specifically, if the thickness of the first protective layer is d1 and the thickness of the interface layer is d2, $d2/(d1+d2)=26/(26+104)=0.20$. Then, it was conveyed to a sputter chamber 3, a recording film 4 comprising $Ge_7Sb_4Te_{13}$ was formed to a thickness of 9 nm, conveyed to a sputter chamber 4 where a second protective layer comprising $(SnO_2)_{80}(ZnS)_{20}$ was formed to 40 nm, conveyed to a sputter chamber 5 where an absorption control layer comprising $Cr_{90}O_{10}$ was formed to 26 nm, and conveyed to a sputtering chamber 6 where a reflective layer comprising $Al_{99}Ti_1$ was formed to 45 nm. Here, although the ratio of Cr and O was slightly different from 2:3 and the ratio of Si and O was shifted slightly from 1:2, these compositions will be referred to as $Cr_2O_3$ and $SiO_2$. Herein, a slight difference means ±20%, and compositions differing from 2:3 therefore mean a range of 2:2.4 to 2:3.6

Thus, the information recording medium of this invention is formed from a laminated film of up to six layers, and film-forming can be performed by a mass production device in up to six chambers for sputtering by sputtering devices.

Figure 6:
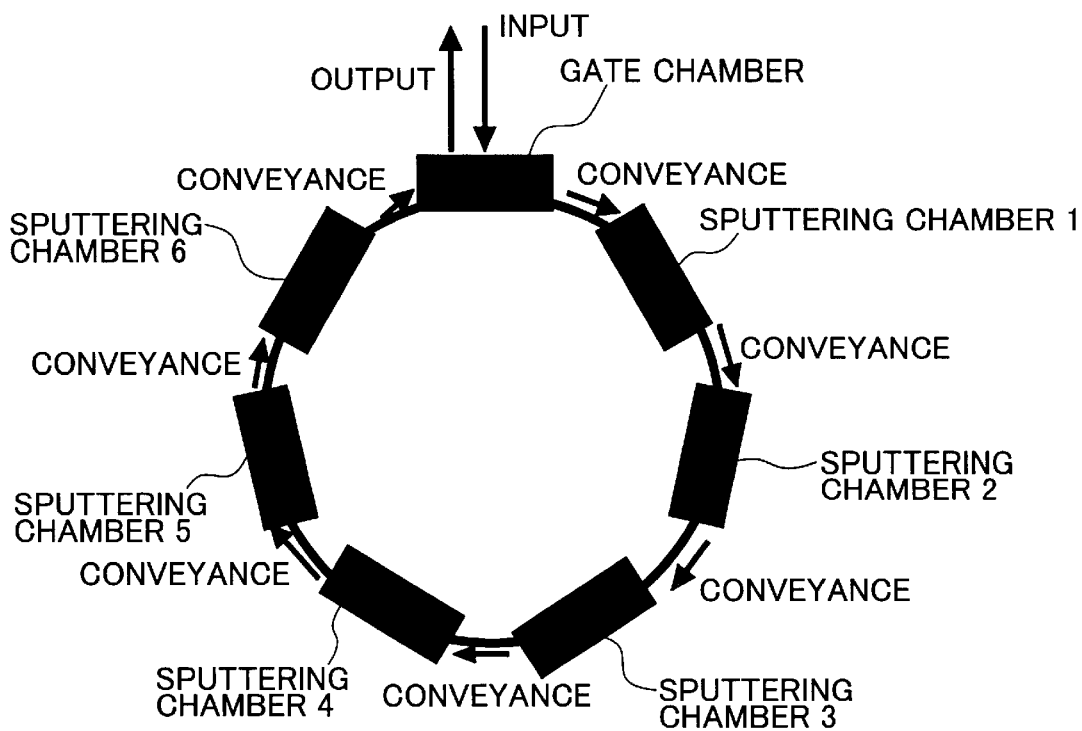
FIG. 6 is a schematic diagram showing an example of a sputter device used for manufacturing the information recording medium according to this invention.

Composition ratios are expressed as atomic % or mole %. The film was formed by a magnetron sputtering device. A first disk member was thus obtained. One example of the above-mentioned sputtering device is shown in FIG. 6. There is a gate chamber for the substrate and the medium after film-forming. The substrate is conveyed to the sputtering chamber 1, and after film-forming of the first protective layer is performed, it is conveyed to the sputtering chamber 2. Next, after the film-forming of the interface layer, it is conveyed to the sputtering chamber 3. After the film-forming of the recording film, it is conveyed to the sputtering chamber 4 to form the second protective layer, to the sputtering chamber 5 for the film-forming of the absorption control layer, and then to the sputtering chamber 6 for the film-forming of the reflective layer. Finally, it is removed from the gate chamber. This invention is also effective even if there are seven or more in-line or sputtering chambers, and sputtering devices are placed therein.

Figure 7:
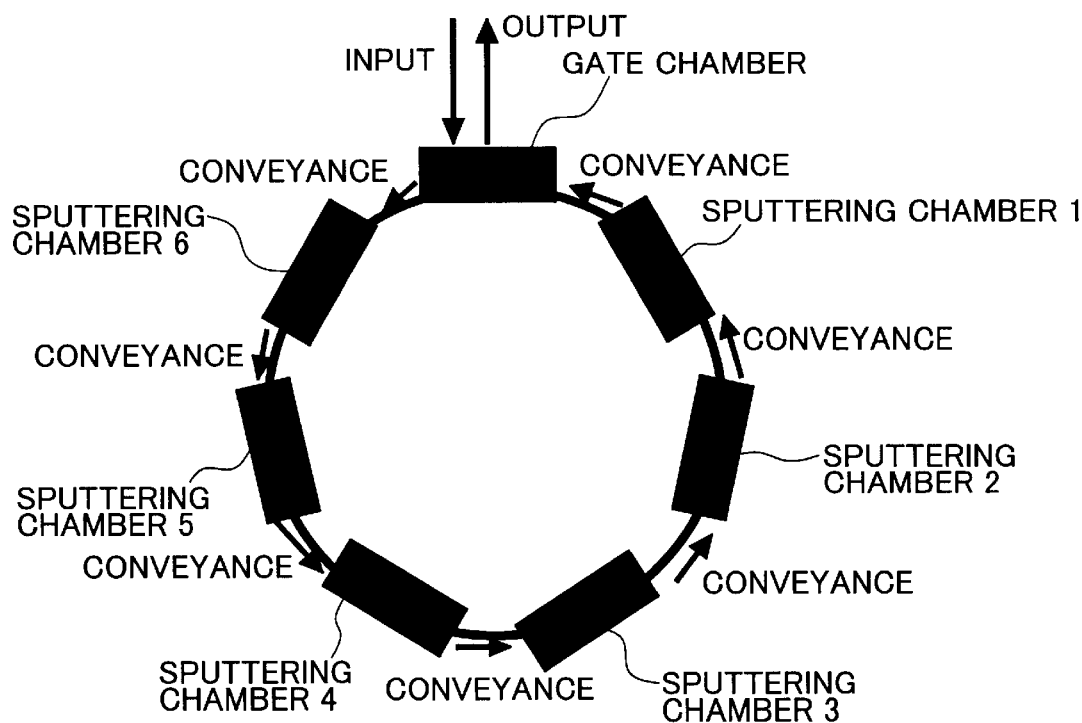
FIG. 7 is a schematic diagram showing another example of the sputter device used for manufacturing the information recording medium according to this invention.
Figure 8:
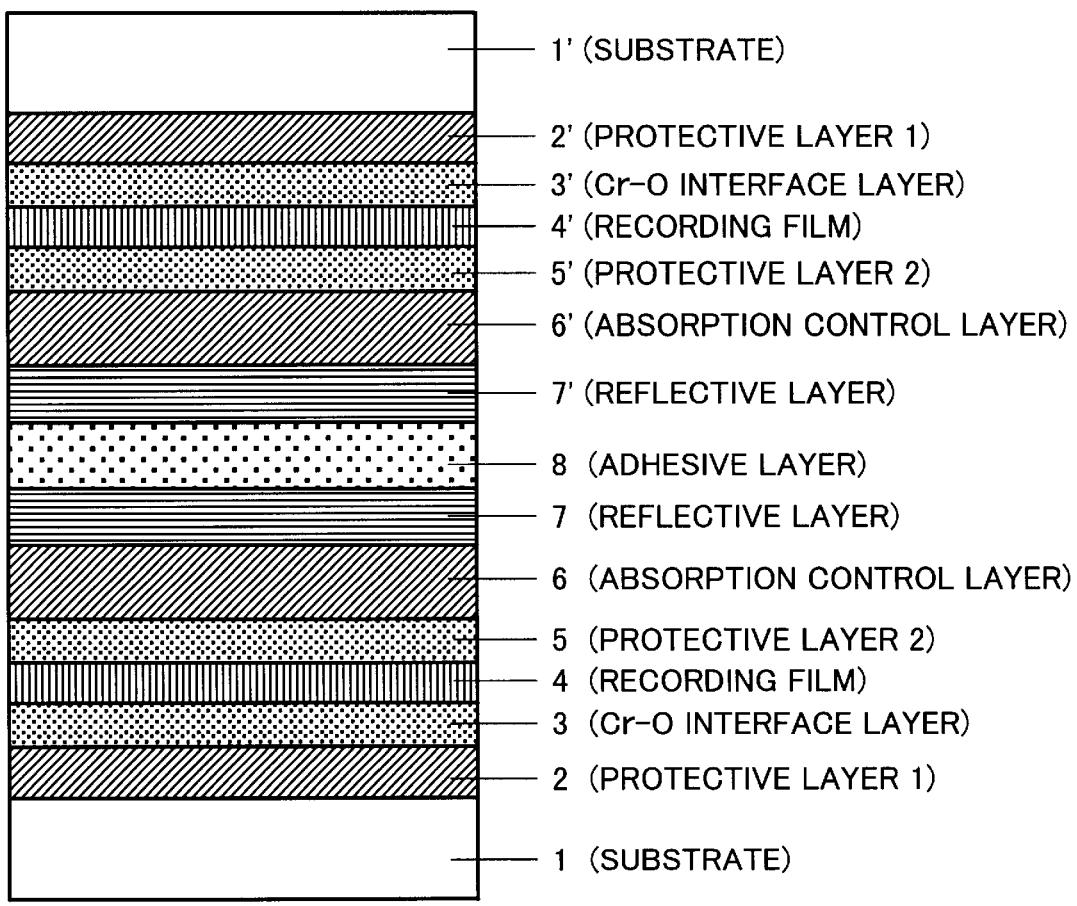
FIG. 8 is a cross-sectional schematic view of one example of an information recording medium according to the prior art.
Figure 9:
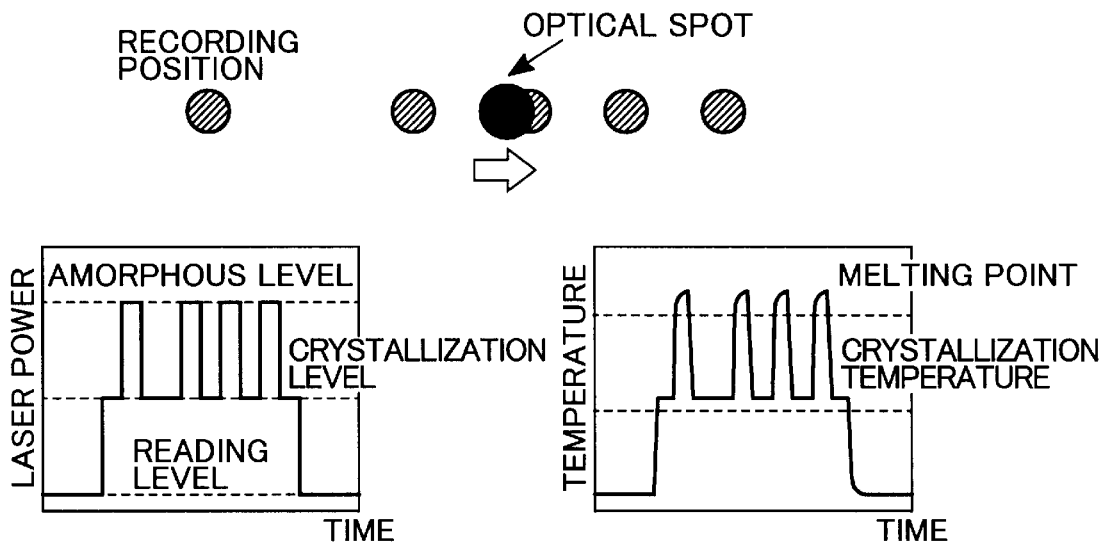
FIG. 9 is a diagram describing the principle of overwriting.
Figure 10:
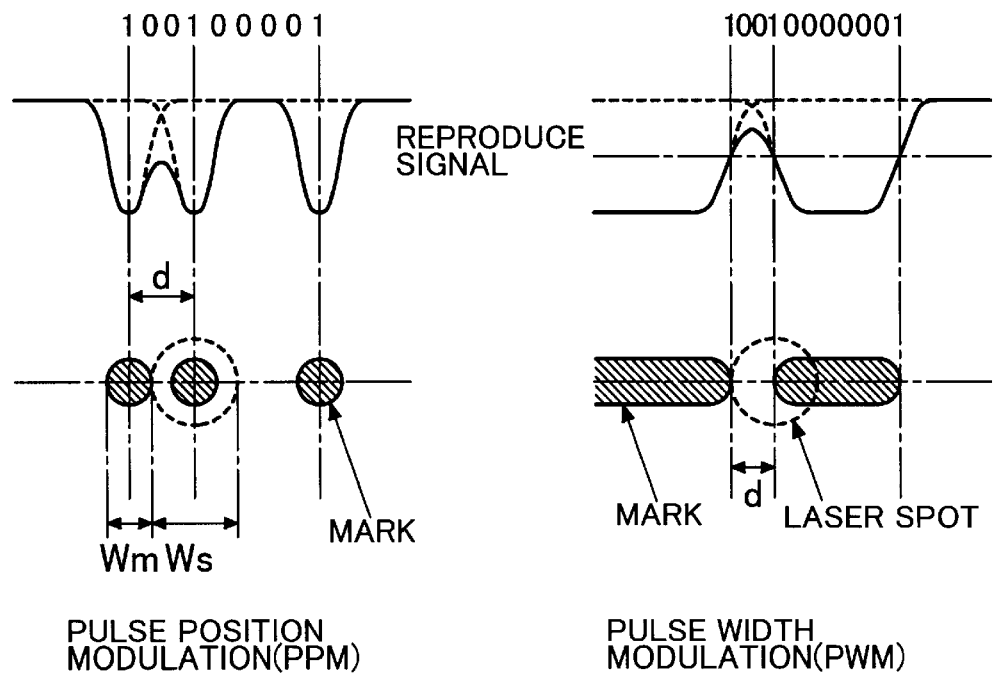
FIG. 10 is a diagram describing mark position recording and mark edge recording.
Figure 11:
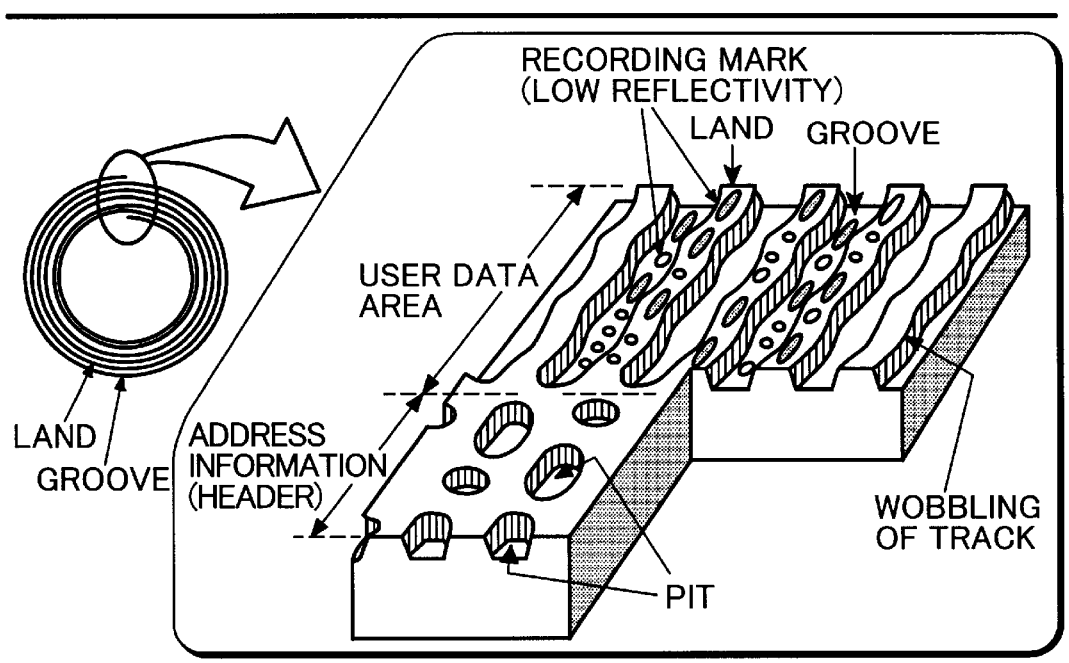
FIG. 11 is a diagram describing the format of the substrate.
Figure 12:
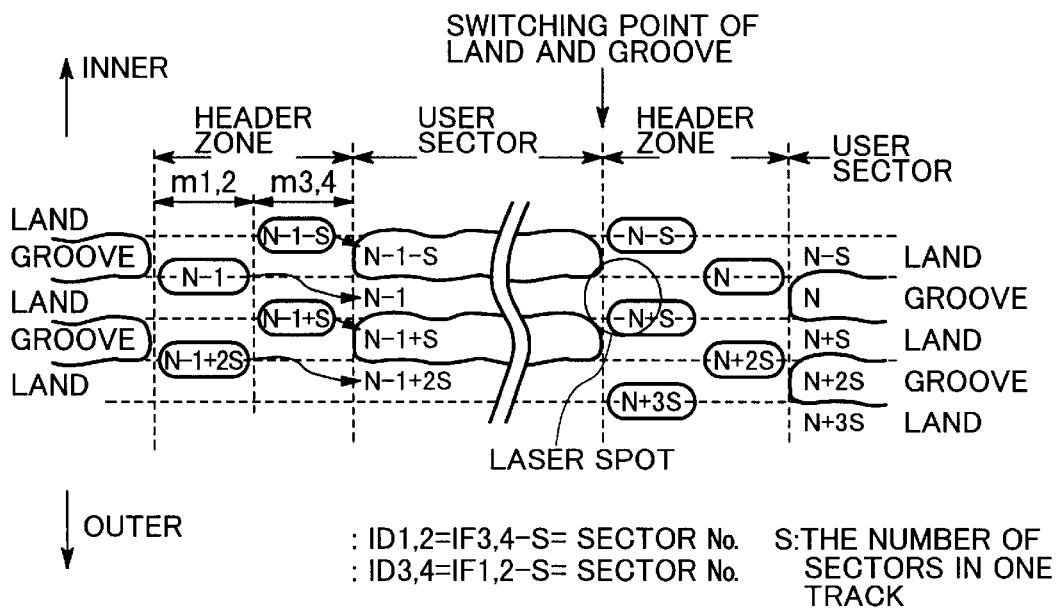
FIG. 12 is a partial schematic view of a header zone in the format of the substrate.

In this embodiment, although the interface layer, recording film, second protective layer, absorption control layer and reflective layer are formed in that order after forming the first protective layer on the substrate, they may be formed in a different order. For example, as shown in FIG. 7, if the reflective layer (sputtering chamber 6), absorption control layer (sputtering chamber 5), second protective layer (sputter chamber 4), recording film (sputter chamber 3), interface layer (sputtering chamber 2) and first protective layer (sputtering chamber 1) are formed in that order on a support, the effect of this invention is the same. The other recording/reproduction characteristics are also the same. The support may be identical to the substrate of this embodiment, or an adhesive layer or the like may be used. Moreover, an adhesive layer may also be used on a second disk.

A second disk member having exactly the same composition as the first disk member was obtained by the same method. Then, a protective coat was given by an ultraviolet radiation curing resin to the film surfaces of the first disk member and second disk member, and the ultraviolet radiation curing resin layers were stuck together via the adhesive layer 8 to obtain the information recording medium shown in FIG. 1. Although a of two-layer recording film was described here, a protective substrate may be used instead of the second disk member, or a multi-layer recording medium having a recording film of three or more layers may be manufactured.

Initial Crystallization Method

The initial crystallization was performed in the recording film of the disk manufactured as mentioned above, as follows. The disk was rotated so that the linear velocity of a spot on a recording track was 6 m/s, the laser light power of a semiconductor laser (wavelength approx. 810 nm), which was elliptical with a spot longer in the radial direction of the medium, was set to 600 mW, and the recording film 4 was irradiated through the substrate 1. The spot was moved ¼ of a spot length at a time in the radial direction of the medium. In this way, initial crystallization was performed.

Recording/Erasing/Reproduction

Information was recorded and reproduced by an information recording/reproduction test device used with the aforesaid recording medium. The operation of this information recording/reproduction test device is described below. Motor control during performing recording/reproduction was by the ZCAV (Zoned Constant Linear Velocity) method wherein the rotation speed of the disk is changed for every zone in which record/reproduce is performed. The disk linear velocity was approx. 8.2 m,/s.

When recording information on the disk, the recording was performed using the so-called 8–16 recording method wherein 8 bits of information are converted to 16 bits. Information from outside the recording device was transmitted to the 8–16 modulator taking 8 bits as one unit. In this modulation method, information on a 3T–14T recording mark length which is made to correspond to 8 bit information is recorded on the medium. Here, T is the period of the clock when information is recorded, which was 17.1 ns. The 3T–14T digital signal transformed by the 8–16 modulator is transmitted to a recording waveform generating circuit. In the recording waveform generating circuit, the 3T–14T signal is made to correspond alternately to "0" and "1" in the time sequence. For "0", an intermediate laser power level is irradiated, and for "1", a high power pulse or pulse train is irradiated. The high power pulse width is set to approx. 3T/2–T/2. When a 4T or higher recording mark is formed, a multi-pulse recording waveform is generated using a pulse train comprising plural high power pulses and the laser irradiation is performed at low power levels with a width of approx. T/2 between pulses, and in parts where recording marks are not formed between the aforesaid pulse trains, laser irradiation is performed at an intermediate power level. In these circumstances, the high power level for forming the recording mark was set to 10.5 mW, the intermediate power level which can erase the recording mark was set to 5 mW, and the low power level which is lower than the intermediate power level, was set to 5 mW. Thus, the low power level may be set the same as the intermediate power level, or it may be another level. In this case, the area where the intermediate power level laser beam was irradiated to the optical disk becomes crystalline (space), and the area where the disk was irradiated by a pulse train of high power level changes to an amorphous recording mark. Moreover, in the above-mentioned recording waveform generating circuit, when a series of high power pulse trains is generated for forming a mark, a multi-pulse waveform table is provided corresponding to the method (adaptive recording waveform control) which changes the head pulse width of the multi-pulse waveform and the pulse width at the tail end according to the length of the spaces in front of and behind the mark. This generates a multi-pulse recording waveform which can eliminate the influence of inter-mark interference between marks to a very large extent. The reflectivity of this recording medium is high in the crystalline state, whereas the reflectivity of the recorded area which is in the amorphous state is low. The recording waveform generated by the recording waveform generating circuit is transmitted to a laser drive circuit, and the laser drive circuit changes the output power of the semiconductor laser in the optical head based on this waveform. Information is recorded by the optical head in this recording device by using a laser beam of wavelength of 660 nm as an energy beam for information recording.

When mark edge recording is performed under the above conditions, the mark length of a 3T mark which is the shortest mark is approx. 0.42 $\mu$m, and the mark length of a 14T mark which is the longest mark is approx. 1.96 $\mu$m. In the recording signal, there is dummy data comprising repeat 4T marks and 4T spaces at the start and end of the information signal. VFO is also contained in the start.

In such a recording method, if new information is recorded by overwrite without erasing the parts on which information is already recorded, the old information is overwritten by the new information. That is, it is possible to overwrite by a single optical spot of approximately circular shape.

Moreover, the recording device described above supports the method (the so-called land groove (L/G) recording method) which records information on both grooves and lands (the areas between grooves). In this recording device, the tracking of lands and groups can be arbitrarily chosen by the L/G servo circuit. However, of course, this application applies not only to a medium for land groove recording, but also to a medium for groove recording.

Reproduction of the recorded information was also performed using the above-mentioned optical head. A 1 mW laser beam is irradiated to the recording track, and the reproduce signal is obtained by detecting the reflected light from the marks and parts other than marks. The amplitude of this reproduce signal is increased by a preamplifier circuit, and transformed into 8-bit information every 16 bits by a 8–16 demodulator. The above operation completes the reproduce of the recorded information.

First, a test disk is set in the tester, and rotated. The optical head is moved to the vicinity of the track where recording/reproduction is to be tested. An automatic focus is applied at this position, and the tracking error signal (difference signal) is monitored with an oscilloscope. The gain of the automatic focus is adjusted so that the tracking error signal amplitude in a groove is a maximum (AF offset adjustment). Next, tracking is performed with the automatic focus still on. Recording is performed by varying the laser power with a random signal, the recording power is found at which the deviation (asymmetry) from the centerline of the envelope of the signal corresponding to the 3T (shortest) mark and space from the centerline of the envelope of the signal corresponding to the longest mark and space, is 5% (5% on the amorphous level side), and this is taken as the optimum recording power. Next, the relation between the radial (radial direction)-Tilt and the jitter value after ten overwrites (optimal power) is measured by a time interval analyzer (TIA), and the radial-tilt at which jitter is a minimum, is found. That is, the jitter at that time is measured while changing the radial tilt, the radial tilt at which the jitter is minimized is calculated, and this is set to the optimal Tilt. Next, a tracking offset adjustment is performed. First, both sides of a group are overwritten 10 times by the optimal power. Then, the crosstalk from the land in a groove is measured with a spectral analyzer. The tracking gain is adjusted so that this crosstalk is a minimum. It is more preferred if the optimal Tilt is calculated again and the tracking offset adjustment is repeated.

Finally, after the AF offset adjustment in the groove, the tracking offset adjustment and radial-Tilt adjustment are likewise performed in a land.

When recording/reproduction of the information recording medium of this invention was carried out and measurement of jitter and reflectivity level was performed, good characteristics, i.e., Ic=90 mV, were obtained after multiple overwrites.

Mass Production

When the sputtering time of each layer was investigated, the first protective layer was 8.5 seconds, the interface layer was 3.3 seconds, the recording film was 0.3 seconds, the second protective layer was 3.4 seconds, the absorption control layer was 3.4 seconds and the reflective layer was 3.0 seconds. After the mass production sputter devices had completed film-forming in each chamber, the substrate was conveyed to the following chamber. The speed of the production process is determined by the chamber for which the film-forming time is the longest.

As described in Embodiment 6, in the prior art (Comparative Example 1), the sputter rate of the interface layer is slow and it was the rate-determining step of the production process. However, it was found that, as the interface layer of this embodiment has a high sputter rate and the production process can be shortened, the number of disks manufactured was increased to 152% that of the prior art (taking the number of disks manufactured in Comparative Example 1 as 100%). Thus, if a Ta—O interface layer is used, overwrite characteristics are good and productivity is also improved.

Further, in a Ta—O material, electrical resistance is low and there is an advantage in that DC sputtering is possible. If DC sputtering is performed, a sputter rate of 1.2 times or more that of RF sputtering can be obtained, and productivity is still further improved.

Composition and Thickness of Recording Film

Instead of the recording film of this embodiment, mixed compositions of GeTe and $Sb_2Te_3$, such as $Ge_2Sb_2Te_5$, $Ge_4Sb_2Te_7$, $Ge_5Sb_2Te_8$, recording films having a composition close to those of the above mixed compositions such as $Ge_{20}Sb_{24}Te_{56}$, recording films in which additional elements are added to the above mixed compositions such as $Ag_2Ge_{21}Sb_{21}Te_{56}$, $Sn_{1.3}Ge_{2.7}Sb_2Te_7$, and recording films having a composition close to the above whereof the main constituent is Ge—Sb—Te, may also be used in which case an identical effect is obtained.

If the recording film thickness is too thin, the contrast decreases, and if it is too thick, the recrystallization area becomes too large. As 10 overwrite jitter increases, it is preferred that the thickness of the recording film is from 7 nm to 13 nm, but even if these limits are exceeded, the effect of the interface layer of this embodiment is still obtained.

Composition and Thickness of Absorption Coefficient Control Layer

The absorption control layer uses Cr or Al, In, Ni, Mo, Pt, Pd, Ti, W, Ge, Sb and Bi, and alloys, compounds or mixtures containing one of these, in order to maintain absorption control and high contrast. It is preferred that the amount of these elements in the alloy or compound is 50 atomic % or more. As this layer absorbs light and transmits light to a suitable degree, light which has been transmitted through the recording film in a recording mark which has a low reflectivity, is reflected by the reflective layer and reabsorbed by the recording film. Thus, the temperature does not rise too much, and Ac/Aa is controlled to be 1 or more.

If the content of elements other than Cr, etc., is within the range of from 0.5 atomic % to 20 atomic %, multiple overwrite characteristics and the tracking error rate improve, and in the range from 1 atomic % to 10 atomic %, there was a further improvement. If oxygen (O) is added to Cr up to 20 atomic %, peeling does not occur so easily which is desirable. An identical effect is obtained by adding Ti.

If the second protective layer comprises materials for which n, k are from 2.0 to 5.0 and k is from −3.0 to −5.5, and the thickness is a suitable thickness, a high contrast ratio can be obtained, and a value of 1 or higher can be obtained for the absorption ratio Ac/Aa of the absorption rate Ac in the crystalline state and the absorption rate Aa in the amorphous state of the recording film, which is very desirable. However, even if these limits are exceeded, an identical effect was observed for the interface layer of this embodiment.

In a high density phase-change optical disk, the track pitch is narrow, and it is necessary to consider the phenomenon known as cross-erase wherein part of the recording mark which is already written on an adjacent track is erased. To prevent this cross-erase, it is important to obtain transverse diffusion of heat. One reason for this is that, in the case of transverse diffusion, heat is less liable to be transmitted in the track direction. If Ac/Aa is greater than 1, the temperature rise of the recording mark part of the adjacent track is less, and this also tends to prevent cross-erase.

Figure 13:
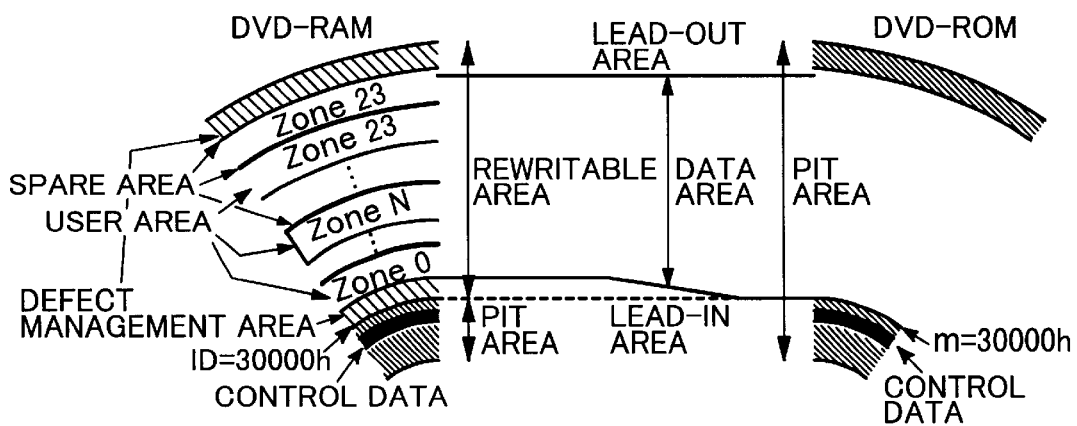
FIG. 13 is a zone layout diagram in the format of the substrate.
Figure 14:
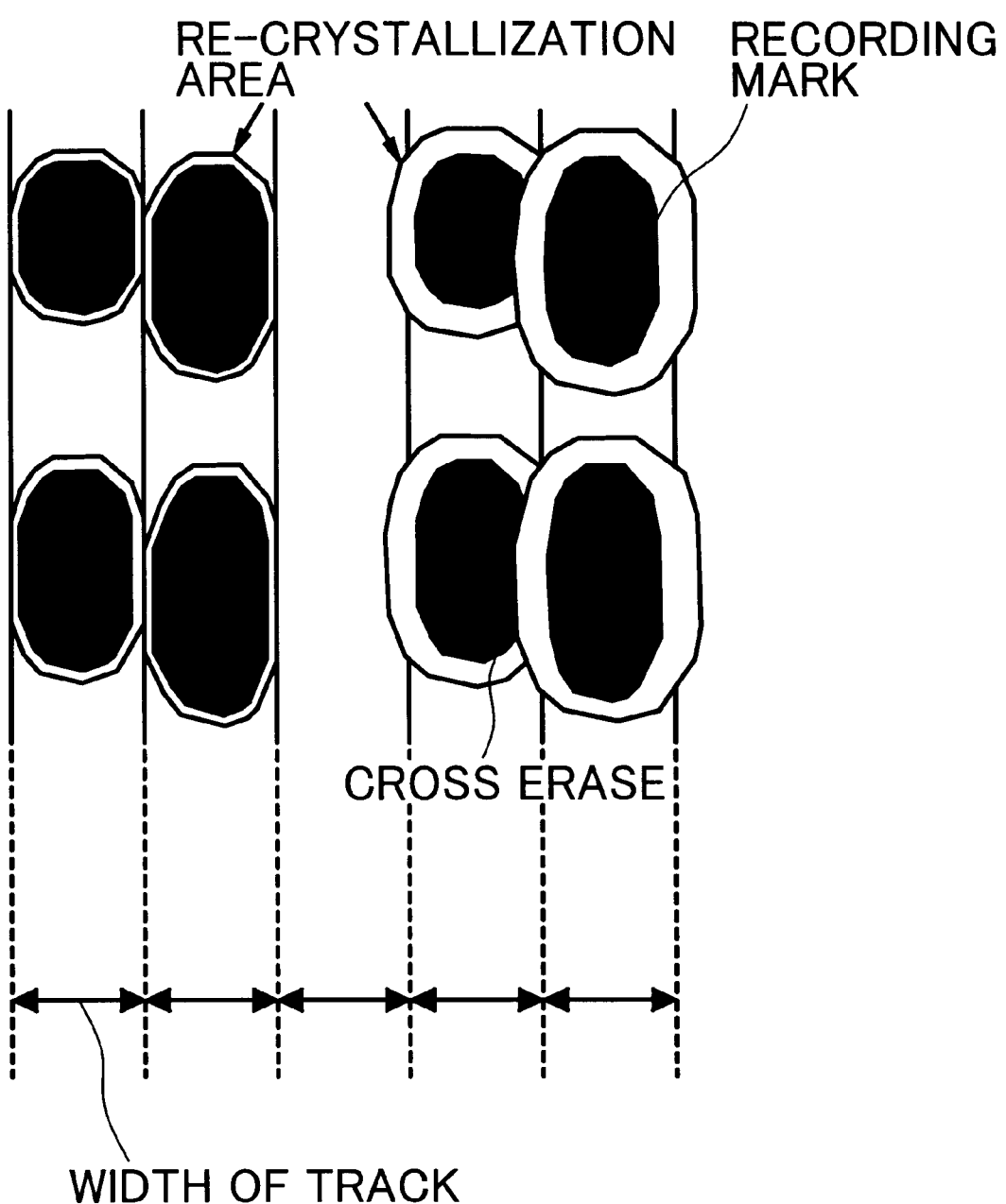
FIG. 14 is a schematic view of a recording film recrystallization area.
Figure 15:
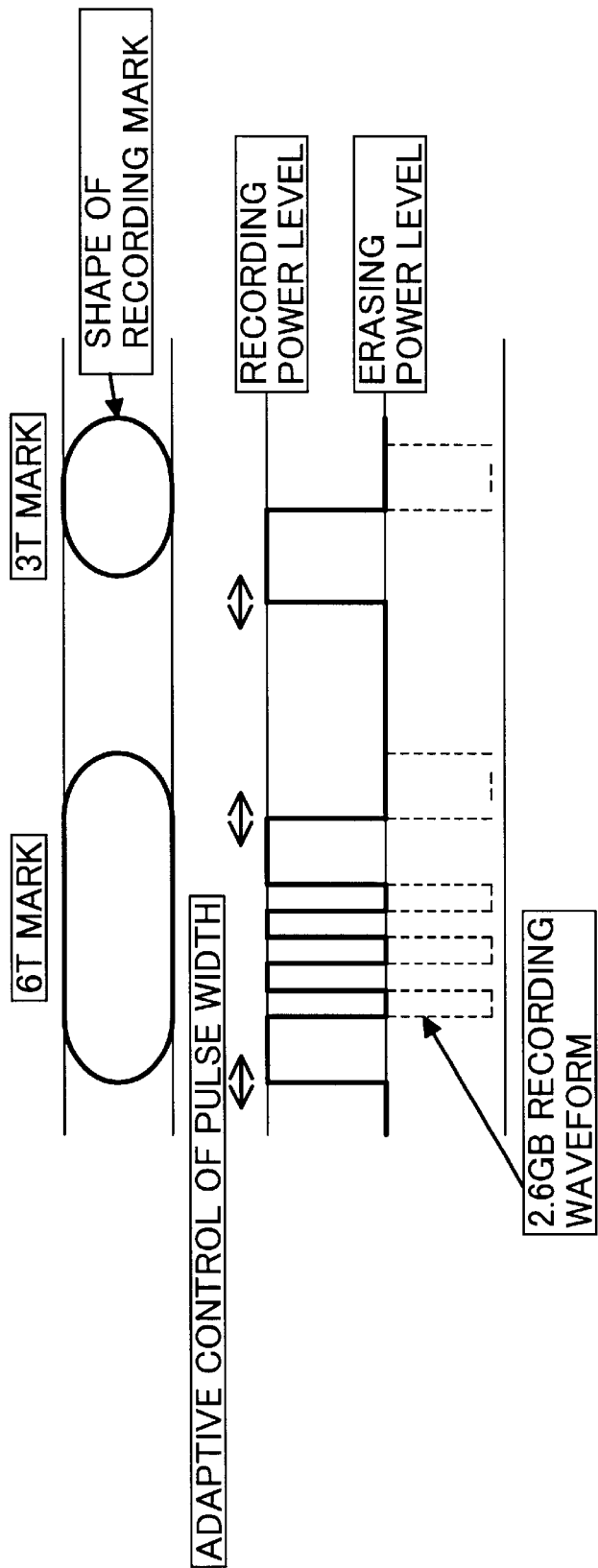
FIG. 15 is a schematic view showing the relation between recording waveform adaptive control and mark length.

To prevent cross-erase, it is also important to prevent recrystallization. As shown in FIG. 13, when recrystallization proceeds from the periphery after melting of the recording film during recording and the part which remains as an amorphous recording mark becomes narrower, it is necessary to melt a wider area in order to form a recording mark of a predetermined size, and temperature rise of the adjacent track occurs more easily.

If heat diffuses in a transverse diffusion, recrystallization can also be prevented. This is because it prevents heat in the center part from diffusing in a lateral direction during formation of the recording mark, leading to a delay in the cooling of the peripheral part of the melting area, and this prevents recrystallization from occurring too easily.

Composition and Thickness of Reflective Layer

For the purpose of heat cooling and maintaining high contrast, the reflective layer uses Al, Ag, Au, Cu and alloys or compounds containing any of these. It is preferred that the content of these elements in the alloy or compound is at least 80 atomic %. In this layer, it is preferred that there is a high heat conductivity and that the reflectivity is also high. To control heat diffusion, an alloy was prepared containing at least one element from Au, Ag, Cu, Al, and this was found to be effective also in improving reproduce signal quality. Substances having an Al alloy as the main component such as Al—Ti, Al—Cr, Al—Ag are costly but preferred. Substances having an Ag alloy as the main component such as Ag—Pd, Ag—Cr, Ag—Ti, Ag—Pt, Ag—Cu, Ag—Pd—Cu, followed by substances having an Au alloy as the main component such as Au—Cr, Au—Ti, Au—Ag, Au—Cu, Au—Nd and substances having a Cu alloy as the main component were also costly, but they have a high thermal conductivity and the bit error rate during overwrites is low. The interface layer of this embodiment was observed to have an identical effect in the case of other materials.

Composition and Thickness of First Protective Layer

In the first protective layer, instead of ZnS—$SiO_2$, oxides, nitrides, carbides, fluorides, tellurides and borides of ZnS, $Sb_2O_3$, $Bi_2O_3$, $Al_2O_3$, $Ga_2O_3$, $In_2O_3$, $SiO_2$, $GeO_2$, $SnO_2$, PbO, ZnO, CuO, $Ag_2O$, NiO, PdO, $PtO_2$, CoO, $Co_2O_3$, $Rh_2O_7$, $IrO_2$, $Ir_2O_3$, FeO, $Fe_2O_3$, $RuO_2$, $OsO_4$, MnO, $MnO_2$, $Mn_2O_3$, $Re_2O_7$, $Cr_2O_3$, $MoO_2$, $MoO_3$, $WO_2$, $WO_3$, $V_2O_5$, $Nb_2O_5$, $Ta_2O_5$, $TiO_2$, $ZrO_2$, $HfO_2$, $Sc_2O_3$, $Y_2O_3$, $La_2O_3$ or Sb, Bi, Al, Ga, In, Si, Ge, Sn, Pd, Zn, Cu, Ag, Ni, Pd, Pt, Co, Rh, Ir, Fe, Ru, Os, Mn, Re, Cr, Mo, W, V, Nb, Ti, Zr, Hf, Sc, Y, La, sulfides and selenides of Bi, Ga, In, Sn, Pb, Zn, Ag, Ni, Co, Fe, Mn, Mo, W, Nb, Zr, Hf and mixtures of same, and substances having a similar composition to these materials, may be used. Of these, ZnS, $Ta_2O_5$, $SnO_2$, $In_2O_3$, ZnO or mixtures of these had an effectively identical sputter rate to that of ZnS—$SiO_2$ and were also preferred from the viewpoint of productivity. If ZnS, $Ta_2O_5$, $SnO_2$, $In_2O_3$, ZnO or their compounds accounted for 50 mole % or more, a sputter rate of approximately 60% or more compared to ZnS—$SiO_2$ was obtained and thus desirable.

Regarding the thickness d1 of the first protective layer and thickness d2 of the second protective layer, in order to obtain a sufficient contrast ratio, in the vicinity of a reproduce wavelength of 660 nm, the total thickness of the two (d1+d2) is in the range from 100 nm to 150 nm. However, even if these limits are exceeded, an identical effect was observed for the interface layer of this embodiment.

Composition and Thickness of Second Protective Layer

As already stated, the same materials can be used for the second protective layer as for the first protective layer. If the thermal conductivity of the second protective layer is too high, heat spreads laterally during recording and cross-erase tends to occur, so ZnS—$SnO_2$, ZnS—$Ta_2O_5$, ZnS—$Cr_2O_3$ in which ZnS, which has a low thermal conductivity, is mixed with $Ta_2O_5$, $SnO_2$, $Cr_2O_3$, are more preferred.

If the thickness of the second protective layer is too thin, increase of jitter occurs due to cross-erase, and if it is too thick, the contrast decreases. Hence, a desirable thickness for the second protective layer is from 25 nm to 45 nm, but even if these limits are exceeded, the interface layer of this embodiment was observed to have an identical effect.

Substrate

In this embodiment, a polycarbonate substrate 1 which has a tracking groove directly on the surface is used. The substrate having a tracking groove is a substrate wherein all or part of the substrate surface has a groove of depth at least λ/10n' (n' is the refractive index of the substrate material) when the recording/reproduction wavelength is λ. The groove may be formed continuously around the circumference or may be split halfway. It was found that when the groove depth was approximately λ/6n, crosstalk was small and therefore preferred. The groove width may also differ according to the position. The narrower the inner circumference, the less problems occur during multiple overwrites. Also, the substrate may have a format such that recording/reproduction is performed on both grooves and lands, or a format such that recording is performed on any of these. If an ultraviolet curing resin is coated to a thickness of approximately 10 µm on the reflective layer of the first and second disks before they are stuck together, and they are then stuck after curing, the error rate is lower. In this embodiment, the two disks are manufactured, and the reflective layer sides of the first and second disks are brought together via an adhesive layer 8. If the substrate material is changed from polycarbonate to a material having a polyolefin as its main component, the substrate surface has increased hardness, and the substrate deformation due to heat is reduced by 10 percent which is desirable. However, the material cost is at least two times higher.

Embodiment 2

An information recording medium was manufactured in an identical way, except that the thickness (d2) of the interface layer and the thickness (d1) of the first protective layer of the information recording medium of the first embodiment, were varied. The thickness (d2) of the interface layer and thickness (d1) of the first protective layer of the manufactured medium were as shown in Table 1.

TABLE 1

Comparison of production number differences

| d1 (nm) | d2 (nm) | d2/(d1 + d2) | This invention | Prior art | Differences |
| --- | --- | --- | --- | --- | --- |
| 7 | 123 | 0.95 | 139% | 19% | 120% |
| 22 | 108 | 0.83 | 139% | 23% | 116% |
| 32 | 98 | 0.75 | 145% | 23% | 123% |
| 43 | 87 | 0.67 | 171% | 26% | 145% |
| 52 | 78 | 0.60 | 193% | 30% | 163% |
| 55 | 75 | 0.58 | 201% | 31% | 170% |
| 65 | 65 | 0.5 | 232% | 35% | 197% |
| 72 | 58 | 0.45 | 248% | 39% | 209% |
| 87 | 43 | 0.33 | 206% | 17% | 189% |
| 91 | 39 | 0.30 | 196% | 60% | 136% |
| 98 | 32 | 0.25 | 181% | 74% | 106% |
| 104 | 26 | 0.20 | 171% | 89% | 82% |
| 108 | 22 | 0.17 | 165% | 106% | 59% |
| 117 | 13 | 0.10 | 155% | 106% | 49% |
| 123 | 7 | 0.05 | 152% | 100% | 52% |

Figure 2:
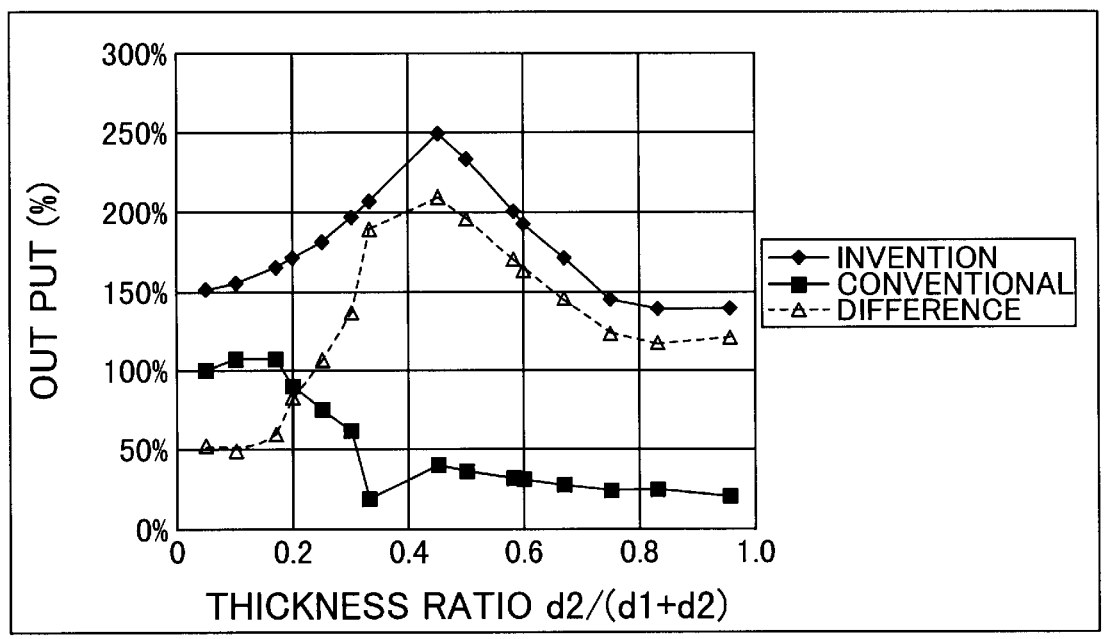
FIG. 2 is a production comparison of the information recording media of this invention and of the prior art.

From this, when the ratio d2/(d1+d2) of the interface layer thickness relative to the total thickness of the first protective layer and interface layer was varied and the number of disks produced was examined, the results shown in Table 1 and FIG. 2 were obtained.

Hence, it is seen that, as the medium of this invention uses an interface layer having a higher sputter rate than the prior art medium where the interface layer was the rate-determining step of the production process, the layer having a high film thickness is the rate-determining step of the production process. As the recording film, second protective layer, absorption control layer and reflective layer are thinner than the first protective layer, they are not rate-determining for the production process. Thus, the inventors discovered that by arranging the first protective layer, which is the rate-determining step of the production process, to be thinner, the number of disks produced can be further increased. Comparing production number differences, it was found that when the thickness ratio d2/(d1+d2) was 0.20 or higher, productivity increased by approximately 170%, which is still more desirable. Further, when the thickness ratio d2/(d1+d2) was 0.30 or higher, productivity increased to as much as approximately 195% (difference from prior art is 136%), which is especially desirable. The materials, thicknesses and evaluation methods for the second protective layer, absorption control layer and reflective layer, which are not described in this embodiment, were identical to those of Embodiment 1.

Herein, a one-layer recording medium having one recording film was described, but an identical increase of productivity is obtained also for a two-layer recording medium having two recording films or a recording medium having three or more recording films.

Embodiment 3

Figure 3:
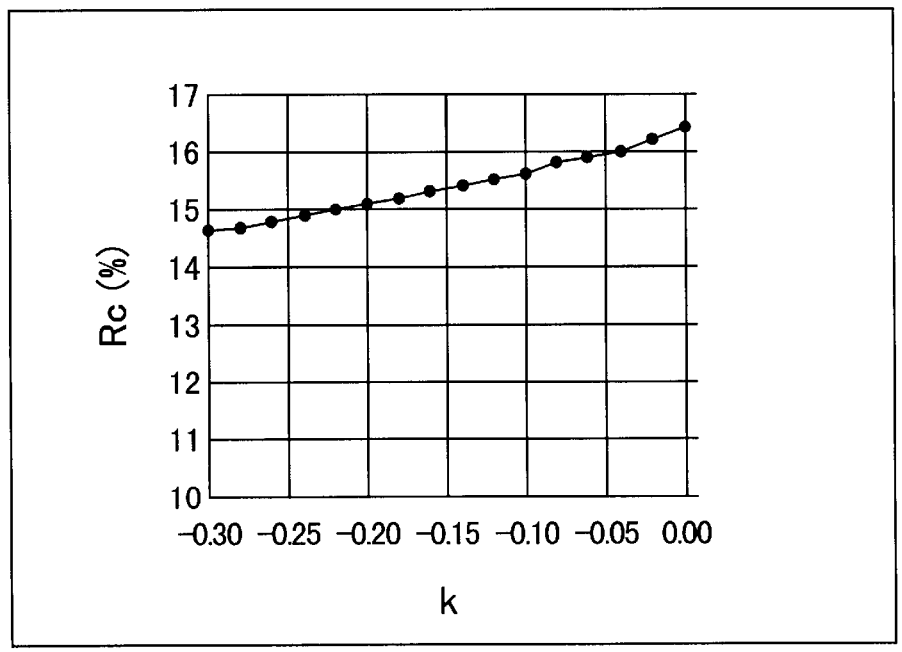
FIG. 3 shows the relation between the extinction coefficient k and reflectivity Rc of an interface layer of the information recording medium according to this invention.

An identical information recording medium was manufactured except that the extinction coefficient k of the information recording medium and interface layer described in Embodiment 1 was varied, and the relation between the extinction coefficient k and reflectivity of the interface layer was examined. The results are shown in Table 2 and FIG. 3.

TABLE 2

Relation between extinction coefficient k and reflectivity (Rc) of interface layer

| K | Rc (%) |
|---|---|
| −0.30 | 14.7 |
| −0.28 | 14.7 |
| −0.26 | 14.8 |
| −0.24 | 14.9 |
| −0.22 | 15.0 |
| −0.20 | 15.1 |
| −0.18 | 15.2 |
| −0.16 | 15.3 |
| −0.14 | 15.4 |
| −0.12 | 15.5 |
| −0.10 | 15.6 |
| −0.08 | 15.8 |
| −0.06 | 15.9 |
| −0.04 | 16.0 |
| −0.02 | 16.2 |
| 0.00 | 16.4 |

As regards the properties of the interface layer, since problems such as loss of reflectivity arise when optical absorption occurs in this layer, it is desirable that the extinction coefficient is small. Hence, to satisfy the reflectivity standard according to specifications (reflectivity Rc of crystalline state 15% or higher), the absolute value of k is preferably 0.22 or less.

The materials, thicknesses and evaluation methods of, for example, the second protective layer, absorption control layer and reflective layer, which are not described in this embodiment, were identical to those of Embodiment 1.

Embodiment 4

An identical information recording medium was manufactured, except that the $Ta_2O_5$ of the information recording medium and interface layer described in Embodiment 1 was changed to $Ta_2O_5$ with the addition of $Cr_2O_3$. The Ta amount when $Cr_2O_3$ was added to $Ta_2O_5$ is shown in Table 3. From this, when the relation between the Ta amount and reflectivity after 10000 overwrites (OW) was examined, the results shown in Table 3 and FIG. 4 were obtained.

TABLE 3

Relation between Ta amount and reflectivity level after multiple OW

| Ta amount (atomic %) | Crystallization level after 10000 OW, Ic (mV) |
|---|---|
| 30 | 65 |
| 29 | 75 |
| 28 | 85 |
| 27 | 88 |
| 26 | 90 |
| 23 | 90 |
| 20 | 90 |
| 17 | 90 |
| 11 | 90 |
| 6 | 90 |
| 3 | 88 |
| 1 | 70 |

Figure 4:
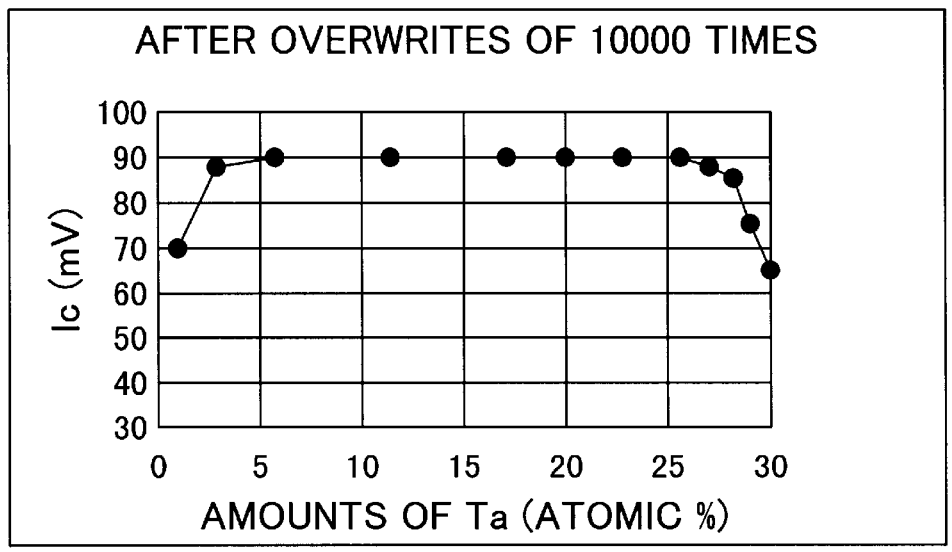
FIG. 4 shows the relation between the Ta amount of the interface layer and crystal level reflectivity after 10000 overwrites of the information recording medium according to this invention.

Herein, Ic on the vertical axis of FIG. 4 is the same as described in Embodiment 1, and when Ic is high, recording/reproduction characteristics are good. Thus, it is preferred that the Ta amount (atomic %) in the interface layer is in the range of from 3 atomic % to 28 atomic %.

All or part of the $Cr_2O_3$ which is added may be replaced by oxides of $Sb_2O_3$, $Bi_2O_3$, $Al_2O_3$, $Ga_2O_3$, $In_2O_3$, $SiO_2$, $GeO_2$, $SnO_2$, $PbO$, $ZnO$, $CuO$, $Ag_2O$, $NiO$, $PdO$, $PtO_2$, $CoO$, $Co_2O_3$, $Rh_2O_7$, $IrO_2$, $Ir_2O_3$, $FeO$, $Fe_2O_3$, $RuO_2$, $OsO_4$, $MnO$, $MnO_2$, $Mn_2O_3$, $Re_2O_7$, $Cr_2O_3$, $MoO_2$, $MoO_3$, $WO_2$, $WO_3$, $V_2O_5$, $Nb_2O_5$, $Ta_2O_5$, $TiO_2$, $ZrO_2$, $HfO_2$, $Sc_2O_3$, $Y_2O_3$, $La_2O_3$, or mixtures of these. The ratio of Sb, Bi, Al, Ga, In, Si, Ge, Sn, Pb, Zn, Cu, Ag, Ni, Pd, Pt, Co, Rh, Ir, Fe, Ru, Os, Mn, Re, Cr, Mo, W, V, Nb, Ti, Zr, Hf, Sc, Y, La and oxygen may depart somewhat from the aforesaid composition ratios, but it is undesirable that the oxygen contained is in the free state, and moreover preferred that it is combined with a metal and/or semi-metal in the interface layer material.

Also, the nitrides, carbides, fluorides, tellurides, borides of Sb, Bi, Al, Ga, In, Si, Ge, Sn, Pb, Zn, Cu, Ag, Ni, Pd, Pt, Co, Rh, Ir, Fe, Ru, Os, Mn, Re, Cr, Mo, W, V, Nb, Ti, Zr, Hf, Sc, Y, La, mixtures of same and compositions close to the above materials can replace all or part of the above.

Of these,

Ta—O—Cr is thermostable and permits a large number of overwrites.

Ta—O—Mn permits the next largest number of overwrites after Ta—O—Cr.

Ta—O—Sn has a higher sputter rate, and is preferred as it can shorten turnaround time during production, but the number of possible overwrites drops by 10 to 20%.

Ta—O—Bi has the next higher sputter rate to Ta—O—Sn.

Ta—O—Ge, Ta—O—Mo have a high adhesive force, and are preferred from the viewpoint that there is little degeneration of the information recording medium due to external shocks.

Ta—O—Zr, Ta—O—Ti have a uniform crystal particle size in during initial crystallization, and there is little increase of jitter during initial overwrite.

The reason why Sb, Bi, Al, Ga, In, Si, Ge, Sn, Pb, Zn, Cu, Ag, Ni, Pd, Pt, Co, Rh, Ir, Fe, Ru, Os, Mn, Re, Cr, Mo, W, V, Nb, Ti, Zr, Hf, Sc, Y, La are considered together as a group is that they give stable compounds like $Cr_2O_3$ which have high melting points, and have satisfactory characteristics as an interface layer.

When multiple overwrites are performed at a thickness of 1 nm or higher, the interface layer functions to prevent the protective layer material from diffusing into the recording film, and to increase adhesive properties. To obtain a satisfactory improvement of crystal growth rate, a thickness of 3 nm or more is preferred.

Embodiment 5

An information recording medium was prepared in exactly the same way, except that the $Ta_2O_5$ of the information recording medium and the interface layer as defined in Embodiment 1 was replaced by $Ta_2O_5$ with the addition of ZnS.

The Ta amount when ZnS was added to $Ta_2O_5$ is shown in Table 4.

TABLE 4

Relation between Ta amount and reflectivity level after multiple OW

| Ta amount (atomic %) | Crystallization level after 10000 OW, Ic (mV) |
|---|---|
| 30 | 63 |
| 29 | 74 |
| 28 | 84 |
| 27 | 88 |
| 26 | 90 |
| 23 | 90 |
| 20 | 91 |
| 17 | 91 |

TABLE 4-continued

Relation between Ta amount and reflectivity level after multiple OW

| Ta amount (atomic %) | Crystallization level after 10000 OW, Ic (mV) |
|---|---|
| 11 | 90 |
| 6 | 89 |
| 3 | 87 |
| 0 | 69 |

Figure 5:
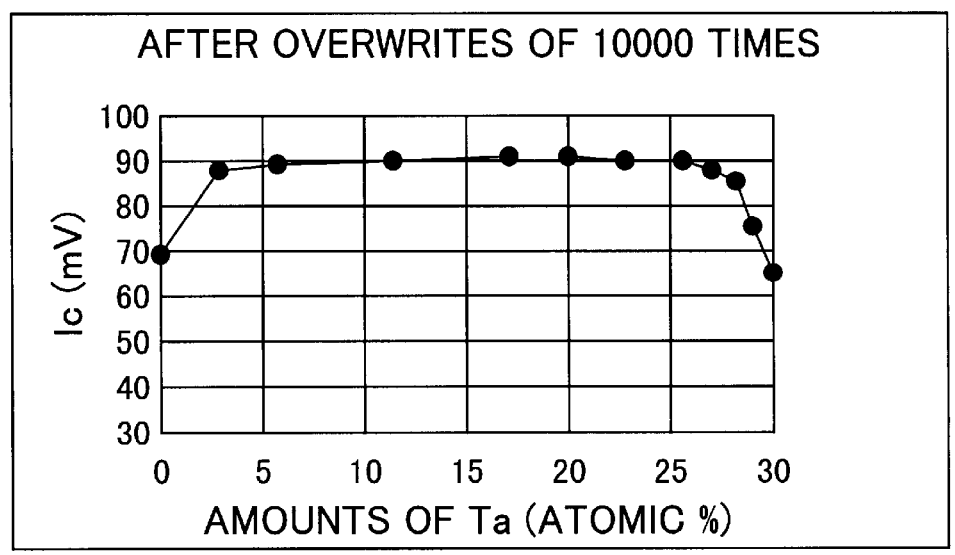
FIG. 5 shows the relation between the Ta amount of the interface layer and crystal level reflectivity after 10000 overwrites of the information recording medium according to this invention.

When the relation between Ta amount and reflectivity level after 10000 overwrites (OW) was examined, the results shown in Table 4 and FIG. 5 were obtained. Ic on the vertical axis in FIG. 5 is identical to that of Embodiment 4. When a sulfide such as ZnS is added, unlike the case where an oxide such as $Cr_2O_3$ is added, if the addition amount is too large, Zn or S diffuses into the recording film, and there is a large drop in reflectivity level after multiple overwrites such as 10000 overwrites. If the addition amount is too small, the reflectivity falls due to absorption in the interface layer. It is thus preferred that the Ta amount (atomic %) in the interface layer is in the range of from 3 atomic % to 28 atomic %.

Composition and Thickness of Interface Layer

Sulfides of Bi, Ga, In, Sn, Pb, Zn, Ag, Ni, Co, Fe, Mn, Mo, W, Nb, Zr, Hf and mixtures of these which are similar to the composition of the above materials may be used to replace all or part of the ZnS. Of these, GaS, $Ga_2S_3$, PbS, ZnS, CoS, FeS, MnS, $MOS_2$, $WS_2$, $ZrS_2$ are stable and therefore preferred.

Next, selenides of Bi, Ga, In, Sn, Pb, Zn, Ag, Ni, Co, Fe, Mn, Mo, W, Nb, Zr, Hf and mixtures of these which are similar to the composition of the above material may be used to replace all or part of it. Of selenides, GaSe, $Ga_2Se_3$, PbSe, ZnSe, CoSe, FeSe, MnSe, $MoSe_2$, $WSe_2$ are stable and therefore preferred.

The reason why Bi, Ga, In, Sn, Pb, Zn, Ag, Ni, Co, Fe, Mn, Mo, W, Nb, Zr, Hf is treated as a group is because, unlike the oxides of Embodiment 4, sulfides or selenides are stable compounds with a high melting point like ZnS, and have satisfactory characteristics for the interface layer.

The materials and thickness ranges of the second protective layer, absorption control layer and reflective layer, which are not described in this embodiment, are for example identical to those of Embodiment 1.

Embodiment 6

Comparative Example 1

An information recording medium having the interface layer and first protective layer of the prior art (Comparative Example 1) was manufactured, and the number of disks produced was compared (FIG. 6). In this disk, only the thickness of the interface layer and first protective layer, and material of the interface layer, were changed from those of the disk of Embodiment 1. The interface layer comprising $Cr_2O_3$ had a thickness of 7 nm, and the first protective layer was made thicker by the amount that the thickness of the interface layer was reduced to give 123 nm. This was optically identical so that the contrast was fixed.

Mass Production

The sputter times of each layer were found to be first protective layer 10.7 seconds, interface layer 3.2 seconds, recording film 0.3 seconds, second protective layer 3.4 seconds, absorption control layer 3.4 seconds and reflective layer 3.0 seconds. In the mass production sputtering device, when film-forming in each chamber was completed, the substrate was conveyed to the next chamber. The chamber which had the longest film-forming time is the rate-determining step of the production process. In the prior art medium, the first protective layer was the rate determining step. The number of disks produced for this medium was taken to be 100%.

The materials, thicknesses and evaluation methods for the second protective layer, absorption control layer and reflective layer, which are not described in this embodiment, were identical to those of Embodiment 1.

As described above, according to the invention, the medium can be obtained which is excellent for mass production and has good recording/reproduction characteristics for high density recording/reproduction.

What is claimed is:

1. An information recording medium comprising:
   a rewritable recording film for recording information by the change of an atomic arrangement due to light irradiation,
   a first protective layer provided on the light incidence side of said recording film, and
   an interface layer provided between said first protective layer and said recording film which is in contact with said recording film,
   wherein the thickness of said interface layer is 0.20 or more but 0.67 or less of the total thickness of said first protective layer and said interface layer, and said interface layer contains at least tantalum (Ta) and oxygen (O).

2. The information recording medium according to claim 1, wherein the total thickness of said first protective layer and said interface layer is 100 nm or more but 150 nm or less.

3. The information recording medium according to claim 1, wherein the thickness of said interface layer is 0.30 or more but 0.60 or less of the total thickness of said first protective layer and said interface layer.

4. The information recording medium according to claim 1, wherein the absolute value of the extinction coefficient k of said interface layer is 0.22 or less.

5. The information recording medium according to claim 1, wherein at least one of Sb, Bi, Al, Ga, In, Si, Ge, Sn, Pb, Zn, Cu, Ag, Ni, Pd, Pt, Co, Rh, Ir, Fe, Ru, Os, Mn, Re, Cr, Mo, W, V, Nb, Ti, Zr, Hf, Sc, Y, La is added to said interface layer.

6. The information recording medium according to claim 1, containing sulphur (S) and a metal element (M=any of Bi, Ga, In, Sn, Pb, Zn, Ag, Ni, Co, Fe, Mn, Mo, W, Nb, Zr, Hf), and the Ta content (atomic %) in said interface layer is in the range of 3 atomic % to 28 atomic %.

7. A method of manufacturing an information recording medium, comprising the steps of:
   forming a first protective layer on a substrate in a first chamber,
   forming an interface layer comprising at least tantalum (Ta) and oxygen (O) on said first protective layer in a second chamber, wherein the thickness of said interface layer is from 0.20 or more but 0.67 or less of the total thickness of said first protective layer and said interface layer,
   forming a rewritable recording film for recording information by the change of an atomic arrangement due to light irradiation which is in contact with said interface layer,
   and forming a second protective layer on said recording film.

8. The method of manufacturing a recording medium according to claim 7, wherein said first protective layer, said interface layer, said recording film and said second protective layer are respectively formed by sputtering.

9. The method of manufacturing an information recording medium according to claim 7, wherein said interface layer is formed by DC sputtering.

10. A method of manufacturing an information recording medium, comprising the steps of:

forming a rewritable recording film for recording on an information in a first chamber by the change of an atomic arrangement due to light irradiation, forming an interface layer containing at least tantalum (Ta) and oxygen (O) in contact with said recording film in a second chamber, forming a protective layer on said interface layer in a third chamber such that the thickness of said interface layer is 0.20 or more but 0.67 or less of the total thickness of the protective layer and interface layer.

11. The method of manufacturing an information recording medium according to claim 10, wherein said recording film, said interface layer and said protective layer are respectively formed by sputtering.

12. The method of manufacturing an information recording medium according to claim 10, wherein said interface layer is formed by DC sputtering.

* * * * *